T. M. HILL.
Corn-Planter.

No. 52,413. Patented Feb. 6, 1866.

Witnesses:
Edward H. Knight
John A. Diedershed

Inventor:
Thomas M. Hill
per Munn & Co.
Attys

UNITED STATES PATENT OFFICE.

THOMAS M. HILL, OF EATON, OHIO.

IMPROVEMENT IN CORN-PLANTERS.

Specification forming part of Letters Patent No. 52,413, dated February 6, 1866.

*To all whom it may concern:*

Be it known that I, THOMAS M. HILL, of Eaton, in the county of Preble and State of Ohio, have made new and useful Improvements in Corn-Planters; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1:
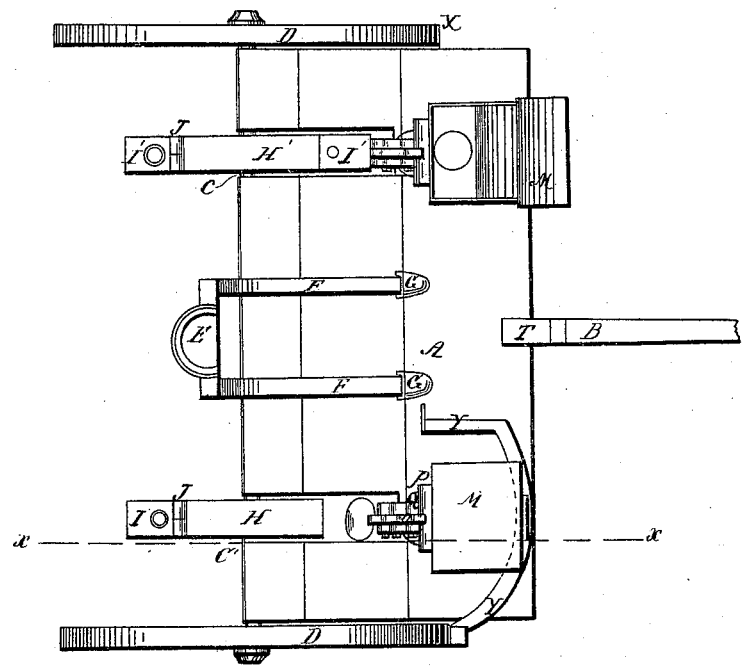
Figure 2:
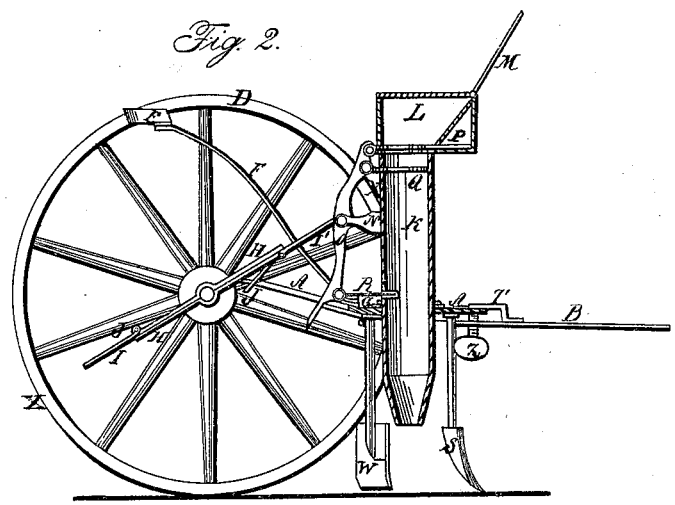

Figure 1 is a plan or top view. Fig. 2 is a vertical section on the line $x\ x$, Fig. 1.

The improvement consists, first, of an arrangement of revolving hinged arms attached to the axle, which act upon the seed-slides, or by retraction to a more limited radius are made inoperative when moving the machine from place to place; second, it consists of a three-slide dropper operated by the revolving arms aforesaid.

In the drawings, A is the platform of the machine, of which B is the tongue, and C the axle, and D D the wheels. On the axle C are two arms, H H', which revolve with it, and on each end of these arms are hinged plates I I', which are capable of being folded back or opened, so as in the one case to revolve without touching the slide-lever O and in the other case to impinge upon the said slide-lever, and by pressing upon it to operate the slides, as will be more particularly described.

Attached to the front part of the machine are two upright cylinders, K, surmounted by boxes L, adapted to carry a supply of seed, and having lids M. On the side of each box is a projecting standard, N, to which is pivoted a spring-lever, O, carrying three slides, (marked P Q R respectively,) whose action is as follows: Taking the position shown in the sectional view, Fig. 2, the seed in the box will rest upon the second slide, Q, until the revolving arm H brings the extension-leaf I in contact with the lever O, when the slide P is retracted, which cuts off the corn contained between it and the slide Q from that in the chamber L. The simultaneous retraction of the slide Q allows the corn contained between the slides P and Q to drop onto the slide R, which has been pushed under it. As soon as the leaf I passes the end of the lever O the latter springs back to the position shown in Fig. 2, the corn on the slide R drops into the furrow formed by the share S, and is immediately covered by the share T. The seat E of the driver is supported by spring-pieces F F from sockets G G.

The seeding arrangements are placed as far apart as the required distance between the rows of corn, and the apparatus is duplicated, one for each row. The extension-pieces I I', which when prolonged act upon the seeding apparatus, are folded back when it is required to move the machine from place to place without calling into operation the seeder.

On one or both of the wheels are knobs or marks X, which indicate the point at which the trigger is tripped, and by observing the position which this point bears against the platform, for instance, of the machine at the time of dropping the operator is able to start another row in correspondence with those already planted.

If the machine is coming up to the work, and not in unison with or exactly opposite to its former position, by means of the brake Y the wheels may be prevented from turning for a part of a revolution, so as to start rightly in correspondence with former rows. This is important, indeed imperative, when it is desired to tend the corn both ways—that is, crosswise.

To regulate the depth of the share, a screw-adjustment, Z, is provided beneath the tongue, which, in connection with the angle-piece T and the platform A, enables the vertical position of the tongue relatively to the platform to be changed as desired, the raising of the end of the tongue relatively to the platform being equivalent to lowering the share, and conversely.

Having described my invention, what I claim therein as new, and desire to secure by Letters Patent, is—

1. The described arrangement of the hinged arms H I I' and the spring-lever O, which latter operates the slides in the seeder, substantially as described.

2. The arrangement of the slides P Q R, lever O, and cylinder K, operating substantially as described and represented.

3. The combination of the marker X, brake Y, and platform A, operating substantially as described.

4. The combination of the screw Z, tongue B, platform A, and angle-piece T, constructed and operated substantially as described and represented.

THOMAS M. HILL.

Witnesses:
B. F. LEARST,
J. T. DEEM.